3,151,100
CATALYTIC POLYMERIZATION OF FORMALDE-
HYDE TO POLYOXYMETHYLENES
Hermann Richtzenhain and Wilhelm Vogt, Cologne-Sulz,
Germany, assignors to Dynamite Nobel Aktiengesell-
schaft, Troisdorf, Bezirk Cologne, Germany, a corpo-
ration of Germany
No Drawing. Filed Mar. 14, 1962, Ser. No. 180,073
Claims priority, application Germany Mar. 14, 1961
5 Claims. (Cl. 260—67)

This invention relates to new and useful improvements in the catalytic polymerization of formaldehyde to high molecular polyoxymethylenes.

The production of high molecular polyoxymethylenes which may be used as plastics, as for example in the production of rods, blocks, pipes, foils, films, plates, and other molded bodies by the catalytic polymerization of formaldehyde, is known. For this process the starting formaldehyde is generally used in an anhydrous monomeric form, and the polymerization is effected by contacting this formaldehyde with a suitable polymerization catalyst, generally in the presence of an insert solvent. As polymerization catalysts there are conventionally used aliphatic and aromatic amines, hydrazines, phosphines, stibines and arsines. It was also known to effect the polymerization at low temperatures, using acid catalysts, or to use carbonyls of Group VIII metals, or organometallic compounds. Quaternary ammonium and phosphonium compounds, as well as tertiary sulfonium compounds, were also described as polymerization catalysts for this process.

One object of this invention is the polymerization of formaldehydes, using an improved catalyst which allows the production of polyoxymethylenes of a higher molecular weight and/or in a greater yield. These and still further objects will become apparent from the following description:

In accordance with the invention it has now been found that amino oxides of secondary and tertiary amines are excellent polymerization catalysts for the polymerization of formaldehyde, allowing the production of polyoxymethylenes with a high molecular weight and in a greater yield than are, for example, obtained with the corresponding known aliphatic and aromatic amine catalysts.

Any of the known or obtainable amino oxides of secondary or tertiary amines may be used as the polymerization catalyst in accordance with the invention. These amines or oxides may be characterized by the general formula

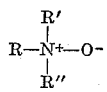

in which R, R' and R" represent aliphatic, cycloaliphatic, or aromatic hydrocarbon radicals, and one of R, R' and R" may be a hydrogen atom. Furthermore these radicals may be joined with the nitrogen atom into a heterocyclic ring, as for example a piperidine, pyridine or quinoline ring. In place of these amino oxides, amino oxides of the corresponding di- or polyamines may also be used. Examples of amino oxides which are suitable as catalysts in accordance with the invention are dimethyl-aniline-oxide, diethyl-aniline-oxide, benzyl-dimethyl-amino-oxide, cyclohexyl-dimethyl-amino-oxide, and methyl-dodecyl-benzyl-amino-oxide.

Example of amino oxides in which the radicals are joined with the nitrogen in the form of a heterocyclic ring, and which are suitable as catalysts, include piperidine, pyridine and quinoline-N-oxide.

Examples of the polyamino oxides which are suitable as catalysts in accordance with the invention are N,N,N', N'-tetraethyl-ethylenediamine-N,N-dioxide, N,N'-dimethyl-N,N'-dibenzyl-hexamethylenediamine-N,N'-dioxide.

These amino oxides constitute known materials which may be prepared in a simple manner by oxidation of the corresponding amines. The formaldehyde used for the polymerization should be in monomeric form (referred to herein as monomer formaldehyde) and should be substantially anhydrous. Any of the known or conventional substantially anhydrous monomer formaldehydes of random origin may be used. Thus the monomer formaldehyde may be obtained from paraformaldehyde, from polyoxymethylenes, and from lower and higher formaldehyde polymers and trioxane. A suitable source of the monomer formaldehyde is the thermal decomposition of paraformaldehyde. The formaldehyde is dissolved in a suitable, substantially anhydrous organic solvent, which is chemically inert with respect thereto, and is contacted with the catalyst at temperatures between about —70° C. and +100° C. and preferably between about 0° C. and 50° C. The catalyst may be used in the form of solutions or suspensions in quantities, for example, between 0.001 and 1% by weight, and preferably between 0.01 and 0.05% by weight based on the solvent. The catalysts are preferably used in the form of a solution, i.e. soluble amino oxides are preferably used since higher yields are obtained than with the use of insoluble amino oxides. The catalyst may be used per se or in admixture with other catalysts, as for example tertiary or secondary amines. The polymerization reaction may be effected, for example, by passing the monomer formaldehyde into a solution of the catalyst, in an inert, organic solvent,[1] at the reaction temperature, which results in the formation of a precipitate which may be separated by filtration and washed and dried.

The polyoxymethylenes produced in accordance with the invention may be used in the same manner as the conventional polyoxymethylenes and thus, after suitable stabilization, may be used as plastic material for the production of rods, blocks, pipes, foils, plates or other molded bodies. The polymerizates obtained are characterized by a high molecular weight and the reduced viscosities thereof generally lie above 0.5 as measured in an 0.5% solution of p-chlorophenol after the addition of 2% alpha-pinene. Generally with the use of amino oxides of secondary amines still higher viscosities are obtained.

In all other respects the process and the working up of the product is effected in the conventional manner.

The following examples are given by way of illustration and not limitation:

*Example 1*

100 g. paraformaldehyde was thermally decomposed at 140° C. and the monomer formaldehyde obtained introduced, after purification, through cooling traps into a solution of 0.2 g. piperidine-N-oxide in 1000 g. hexane at 25° C. Polyoxymethylene formed after a short time, as a white, flaky precipitation. After three hours of introduction the precipitate was separated by filtration, washed with ether and dried for 12 hours at 40° C. under vacuum. A high molecular polyoxymethylene was obtained whose reduced viscosity amounted to 4.40 (measured at 60° C. in 0.5% solution in p-chlorophenol under addition of 2% alpha-pinene).

*Example 2*

56 g. of monomer formaldehyde were introduced in the course of 3 hours into a reaction vessel, which contained a solution of 200 mg. piperidine-N-oxide in 1000 ml. hexane at 15° C. 39 g. polymerizate were obtained ---
[1] Such as an aliphatic, cycloaliphatic or aromatic hydrocarbon, a halogenated hydrocarbon or an aliphatic, cycloaliphatic or aromatic ether.

(69.8% yield), which showed a reduced viscosity of 2.7.

In a test carried out by way of comparison with tri-n-butylamine under equal conditions, a yield of 39.6% was obtained and the reduced viscosity was 2.6.

Example 3

45 g. of monomer formaldehyde were introduced into 800 ml. hexane in the course of 2.5 hours and a solution of 0.2 g. dimethyl-benzylamino-oxide in 400 ml. methylene-chloride added drop-by-drop. The temperature of the reaction medium rose from 22° C. to 40° C. After the end of the reaction the polyoxymethylene separated as thick flakes, was suction-filtered, washed with acetone and dried. 39 g. polymerizate were obtained (87% yield).

Example 4

0.2 g. dimethylaniline-oxide (dissolved in 400 ml. methylene-chloride) was added to 800 ml. of hexane, which was kept at 20° C. Through this solution 150 g. monomer formaldehyde was conducted in constant flow for 4 hours. A 62% yield of high molecular polyoxymethylene was obtained. This polymethylene was acetylated through boiling with acetic acid anhydride in the presence of sodium acetate. The acetylated products showed, upon heating to 222° C. under nitrogen, a weight loss of 0.1% per minute.

Example 5

100 g. purified monomer formaldehyde was introduced at 25° C. into 1000 ml. of hexane, in which 0.264 g. pyridine-N-oxide and 0.2 g. tri-n-butylamine were dissolved. After 2.5 hours the polymerization was terminated. The precipitated product was suction-filtered, washed with ether and dried at +40° C. for 12 hours in a vacuum drying cabinet. The reduced viscosity of the high molecular polyoxymethylene amounted to 3.12. After acetylation with acetic acid anhydride in the presence of sodium acetate, the polyoxymethylene showed, upon heating to 222° under nitrogen, a weight loss of 0.06% per minute.

Example 6

Repeating Example 1, using however in place of the piperidine-N-oxide, the following oxides (a) dimethyl-aniline-oxide
(b) diethyl-aniline-oxide
(c) benzyl-dimethyl-amino-oxide
(d) cyclohexyl-dimethyl-amino-oxide
(e) methyl-dodecyl-benzyl-amino-oxide
(f) N,N,N', N'-tetraethyl-ethylenediamine-N,N-dioxide
(g) N,N'-dimethyl-N,N'-dibenzyl-hexamethyl-enediamine-N,N'-dioxide
(h) pyridine-N-oxide
(i) quinoline-N-oxide will produce comparable results.

We claim:

1. Process for the production of high molecular polyoxymethylenes which comprises polymerizing substantially anhydrous monomer formaldehyde in the presence of a polymerization catalyst selected from the group consisting of amine oxides of tertiary amines and amine oxides of secondary amines at a temperature between about −70° and 100° C. in the presence of a substantially anhydrous inert, organic solvent, and recovering the high molecular polyoxymethylenes produced.

2. Process according to claim 1 in which said polymerization is effected at a temperature between about 0° and 50° C.

3. Process according to claim 1 in which said catalyst is pyridine-N-oxide.

4. Process according to claim 1 in which said catalyst is present in amount of about 0.001–1%.

5. Process according to claim 4 in which said catalyst is present in amount of about 0.01–0.05% by weight.

No references cited.

UNITED STATES PATENT OFFICE
CERTIFICATE OF CORRECTION

Patent No. 3,151,100                  September 29, 1964

Hermann Richtzenhain et al.

It is hereby certified that error appears in the above numbered patent requiring correction and that the said Letters Patent should read as corrected below.

In the grant, lines 2 and 3, and line 13, and in the heading to the printed specification, lines 5 and 6, name of assignee, for "Dynamite Nobel Aktiengesellschaft", each occurrence, read -- Dynamit Nobel Aktiengesellschaft --.

Signed and sealed this 2nd day of February 1965.

(SEAL)
Attest:

ERNEST W. SWIDER                 EDWARD J. BRENNER
Attesting Officer                  Commissioner of Patents